(12) United States Patent
Konig et al.

(10) Patent No.: US 8,286,532 B2
(45) Date of Patent: Oct. 16, 2012

(54) TRANSMISSION CONTROL AND METHOD FOR MOUNTING A TRANSMISSION CONTROL

(75) Inventors: Hubert Konig, Meckenbeuren (DE); Kim Fuhrer, Lindau (DE); Markus Ulbricht, Tettnang (DE); Thomas Puth, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 787 days.

(21) Appl. No.: 12/514,475

(22) PCT Filed: Nov. 5, 2007

(86) PCT No.: PCT/EP2007/061849
§ 371 (c)(1),
(2), (4) Date: May 12, 2009

(87) PCT Pub. No.: WO2008/058861
PCT Pub. Date: May 22, 2008

(65) Prior Publication Data
US 2010/0056329 A1  Mar. 4, 2010

(30) Foreign Application Priority Data
Nov. 17, 2006 (DE) .......................... 10 2006 054 279

(51) Int. Cl.
*F16H 57/02* (2006.01)
*F16H 57/04* (2010.01)
*F16H 61/00* (2006.01)

(52) U.S. Cl. .................................................. 74/606 R

(58) Field of Classification Search .................. 74/335, 74/336 R, 606 R
See application file for complete search history.

(56) References Cited

U.S. PATENT DOCUMENTS

| | | | | |
|---|---|---|---|---|
| 4,744,009 A * | 5/1988 | Grabbe et al. | ................. | 361/749 |
| 5,311,398 A * | 5/1994 | Schirmer et al. | ............. | 361/704 |
| 5,361,650 A | 11/1994 | Klecker et al. | | |
| 6,160,708 A * | 12/2000 | Loibl et al. | ..................... | 361/704 |
| 6,515,228 B2 | 2/2003 | Albert et al. | | |
| 6,679,137 B1 * | 1/2004 | Bek | .............................. | 74/606 R |
| 6,739,042 B2 * | 5/2004 | Thorum | ......................... | 29/832 |
| 6,909,954 B2 * | 6/2005 | Fischer et al. | .................. | 701/51 |
| 7,073,410 B2 * | 7/2006 | Albert | ......................... | 74/606 R |
| 7,080,575 B2 * | 7/2006 | Jungbauer et al. | .......... | 74/606 R |
| 7,086,289 B2 | 8/2006 | Bethke et al. | | |
| RE39,272 E * | 9/2006 | Loibl et al. | ..................... | 174/549 |
| 7,656,674 B2 * | 2/2010 | Wetzel et al. | ................. | 361/752 |
| 7,749,134 B2 * | 7/2010 | Wetzel et al. | ................... | 477/34 |
| 2008/0048540 A1 * | 2/2008 | Kim | ............................. | 312/408 |

FOREIGN PATENT DOCUMENTS

| | | |
|---|---|---|
| DE | 197 10 931 A1 | 10/1997 |
| DE | 199 55 603 C1 | 2/2001 |
| DE | 103 03 078 A1 | 8/2004 |
| DE | 10 2005 015 768 A1 | 10/2006 |

* cited by examiner

*Primary Examiner* — Troy Chambers
*Assistant Examiner* — Michael Gonzalez
(74) *Attorney, Agent, or Firm* — Davis & Bujold, P.L.L.C.

(57) ABSTRACT

A transmission control having an electronic control unit (17), at least one mechatronic component (19, 20, 21), and a housing (2) comprising an upper housing part (3), a lower housing part (5), and a central housing part (4). These housing parts together form at least one receiving space (8, 10, 11, 12) for the control unit (17) and/or the mechatronic component (19, 20, 21) which is arranged between the upper housing part (3) and the lower housing part (5). The control unit (17) and/or the at least one mechatronic component (19, 20, 21) are fastened on the upper housing part (3). A process for installation of a transmission control (1) is also disclosed.

20 Claims, 2 Drawing Sheets

TRANSMISSION CONTROL AND METHOD FOR MOUNTING A TRANSMISSION CONTROL

This application is a National Stage completion of PCT/EP2007/061849 filed Nov. 5, 2007, which claims priority from German patent application serial no. 10 2006 054 279.7 filed Nov. 17, 2006.

FIELD OF THE INVENTION

The invention concerns a transmission control having an electronic control unit, at least one mechatronic component, and a multi-part housing, with a upper housing part, a lower housing part, and a central housing part, which is arranged between the upper housing part and the lower housing part, forming at least one receiving space for the control unit and/or the mechatronic component. The invention concerns also a process for installation of a transmission control such as this.

BACKGROUND OF THE INVENTION

Different housings for transmission controls are known from the state of the art. Thus a control device for a transmission having a multi-part housing is known from the practice in particular. This housing includes a metal cover and a lower housing part, whereby a frame element is provided between the metal cover and the lower housing part, so that a space for the electronic control unit as well as the mechatronic components of the transmission control arises. The known control device is then fastened on the transmission or transmission housing together with the lower housing part.

The known control device has proven itself, but is disadvantageous to the extent that it is expensively constructed and can only be installed or assembled with great expenditure.

SUMMARY OF THE INVENTION

Consequently, the invention is based upon the objective of creating a transmission control with an electronic control unit, at least one mechatronic component, and a multi-part housing, which can be easily installed or assembled. A simple test of the control unit as well as of the mechatronic components before and after installation should also be possible. The invention is furthermore based upon the objective of disclosing a process for installation of such an advantageous transmission control.

The transmission control according to the invention has an electronic control unit, at least one mechatronic component, and a multi-part housing. The electronic control unit serves for controlling the mechatronic components. Mechatronic components can be understood as sensors and actuators of the transmission control. The multi-part housing consists of a upper housing part, which can be constructed as a covering cover; a lower housing part, which can be formed by the transmission housing itself; and a central housing part. The central housing part is arranged between the upper housing part and the lower housing part and forms at least one receiving space for the control unit and/or the mechatronic components. The central housing part can thus be constructed as a circular frame, within which cross braces extend in order to produce several receiving spaces. The control unit and/or the at least one mechatronic component is then fastened on the housing part according to the invention.

A particularly easy installation of the transmission control is ensured by fastening the control unit and/or the mechatronic component on the upper housing part. The mechatronic components can in this way all be fastened on the upper housing part before the latter is fastened on the transmission or on the other components of the multi-part housing together with the upper housing part. A previous single test of the control unit and/or the mechatronic components is possible.

In order to simplify the assembly further, the upper housing part is constructed in one piece in a preferred embodiment of the transmission control according to the invention. All of the mechatronic components can consequently first be fastened on the single part upper housing part, which can then be connected as one piece to the transmission or the other components of the multi-part housing.

In a particularly preferred embodiment of the transmission control according to the invention, the electronic control unit and/or the mechatronic component is fastened on the upper housing part with a central housing part positioned between them. The central housing part is in this way also automatically fastened on the upper housing part, whereby the installation is further simplified. Merely the mechatronic components are fastened on the upper housing part, preferably with the central housing part section of the housing positioned between them, while the electronic control unit is fastened directly on the upper housing part.

In another preferred embodiment of the transmission control according to the invention, the central housing part is likewise fastened on the upper housing part by fastening the electronic control unit and/or the mechatronic component on the upper housing part, as was already described above.

According to another preferred embodiment of the transmission control according to the invention, electric conductors for connecting the electronic control unit and/or the mechatronic components are provided on the central housing part. These electric conductors can be cast in the central housing part if the latter is made of plastic. Connections of the electric conductors can also be arranged on the central housing part, whereby these are arranged in such a way that the electronic control unit and/orate mechatronic component is automatically connected to the connection when the control unit and/or the mechatronic component is fastened on the upper housing part. A connection to the electric conductors is thus automatically produced by installing the control unit and/or the mechatronic component on the upper housing part, by means of which the installation is considerably simplified.

In an advantageous embodiment of the transmission control according to the invention, the electronic control unit is installed directly on the upper housing part. A spatial separation in relation to the mechatronic components of the transmission control, which are less prone to malfunction, can be created in this way.

According to another advantageous embodiment of the transmission control according to the invention, the central housing part is constructed in such a way that a first receiving space exists, which is delimited merely by the upper housing part and the central housing part. The first receiving space is sealed off with respect to the other receiving spaces for the mechatronic components of the transmission control and accommodates merely the electronic transmission control. A particularly reliable protection of the control unit, which is prone to malfunction, is ensured in this way.

In another advantageous embodiment of the transmission control according to the invention, sealants are provided on the upper housing part, the lower housing part, and/or the central housing part, by means of which a mutual sealing between the receiving spaces or a sealing of the receiving spaces with respect to the environment is ensured. These sealants can include circular sealing rings, which are arranged on the mutually facing sides of the housing components in order to ensure sealing at the mutually adjacent regions.

In order to further simplify the installation, the electronic control unit and/or the mechatronic component is fastened, with the aid of screws, on the upper housing part in another advantageous embodiment of the transmission control according to the invention. However, merely the mechatronic components are fastened in this way, whereas the electronic control unit can be easily fastened by means of adhesive on the upper housing part.

According to another preferred embodiment of the transmission control according to the invention, the screws extend through recesses in the control unit and/or mechatronic component and/or in the central housing part, whereby a bushing is provided in the recess. A bushing such as this should be harder than the surrounding material of the recess in order to protect the corresponding part from damage.

In another preferred embodiment of the transmission control according to the invention, the upper housing part and the lower housing part are made of metal, while the central housing part is made of plastic. While the upper housing part and the lower housing part made of metal provide good protection for the control unit and/or the mechatronic components, the central housing part made of plastic makes possible a simple connection of the mentioned components, above all because the electric conductors can be easily cast into the central housing part.

According to a further advantageous embodiment of the transmission control according to the invention, the lower housing part is constructed as one piece with a transmission housing. In this way, a particularly compact design of the transmission control is attained.

According to another particularly preferred embodiment of the transmission control according to the invention, the upper housing part is fastened on a transmission housing with the central housing part and the lower housing part interposed between them. The installation is also considerably simplified in this way, since only the upper housing part must be fastened on the transmission housing in order to also fasten the remaining components of the transmission control on the transmission housing, namely the electronic control unit, the mechatronic components, the central housing part, and the lower housing part, insofar as the latter is not constructed as an integral part with the transmission housing.

According to a further preferred embodiment of the transmission control according to the invention, the upper housing part and the lower housing part are only indirectly adjacent to each other. The upper housing part can thus be adjacent the lower housing part via screws, but not directly, but rather a thermal decoupling of the upper housing part from the lower housing part or the transmission housing is produced by means of the central housing part positioned between them, so that the electronic control unit fastened on the upper housing part is particularly well protected.

According to another preferred embodiment of the transmission control according to the invention, the central housing part is arranged so as to be visible from outside between the upper housing part and the lower housing part. The installation of the transmission control according to the invention is also highly simplified in this way.

In an advantageous embodiment of the transmission control according to the invention, an external connection is provided on the central housing part for connecting the electronic control unit to an external device. The external device could be, for example, a manually operable control unit. The external connection can be realized particularly well and easily on the central housing part if the central housing part is made of plastic.

In another advantageous embodiment of the transmission control according to the invention, the mechatronic component is a sensor, such as a travel sensor, a position sensor, or the like, or an actuator, such as a selecting magnet, a valve module, or the like.

The method according to the invention for installation of a transmission control comprises the following process steps: Preparing a upper housing part, a central housing part, and a lower housing part, as well as an electronic control unit and/or at least one mechatronic component of the transmission control, fastening the electronic control unit and/or the mechatronic component on the upper housing part with a central housing part positioned between them, and fastening the upper housing part together with the electronic control unit and/or the mechatronic component and the central housing part on the lower housing part. Reference is made to the description of the transmission control according to the invention with regard to the possible further configuration of the individual parts. Reference is likewise made to the above description of the transmission control according to the invention with regard to the advantages of the method according to the invention.

In a preferred embodiment of the method according to the invention for installation of a transmission control, the electronic control unit is first fastened directly onto the upper housing part before the mechatronic component is fastened onto the upper housing part. This means that solely the mechatronic components are fastened on the upper housing part with the central housing part section of the housing between them.

BRIEF DESCRIPTION OF THE DRAWINGS

The invention will be explained in greater detail in the following on the basis of exemplary embodiment with reference to the associated drawings, wherein.

DETAILED DESCRIPTION OF THE PREFERRED EMBODIMENTS

Figure 1:
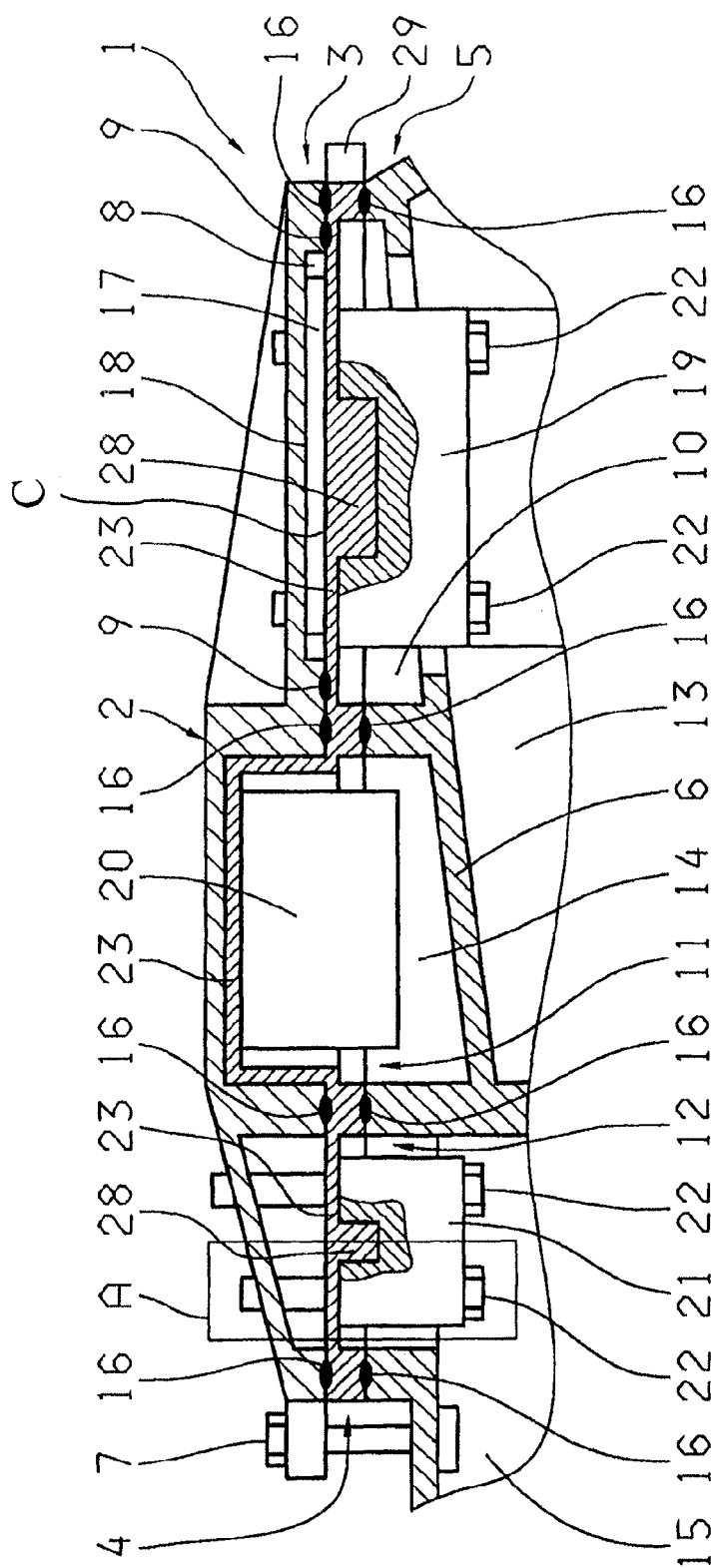
FIG. 1 shows a lateral sectional view of an embodiment of the transmission control and FIG. 2 shows a cutout A from FIG. 1 in enlarged representation.

FIG. 1 shows a lateral sectional of an embodiment of the transmission control 1 according to the invention. The transmission control 1 has a housing 2 consisting of several parts. The multi-part housing 2 is comprised by a cover-like upper housing part 3, a central housing part 4, and a lower housing part 5, wherein the lower housing part 5 is constructed as one piece with a transmission housing 6. The upper housing part 3, as well as the lower housing part 5, are made of metal, whereas the central housing part 4 is made of plastic.

The upper housing part 2 is fastened, via screws 7 or the like, on the transmission housing 6, with the central housing part 4 and the lower housing 5 between them. The upper housing part 3 and the lower housing part 5 are adjacent merely indirectly to each other, that is, a direct bordering of the upper housing part 3 on the lower housing part 5 does not take place, since the central housing part 4 is arranged between them. The central housing part 4 is arranged in a sandwich-like manner between the upper housing part 3 and the lower housing part 5 so as to be visible from outside, which considerably simplifies the installation of the transmission control 1.

The upper housing part 3, the central housing part 4, and the lower housing part 5 are constructed in such a way that together they form receiving spaces. Between the upper housing part 3 and the central housing part 4 there exists a first receiving space 8, which is bounded solely by the upper housing part 3 and the central housing part 4. The first receiving space 8 is sealed therein with respect to the other receiving spaces with the aid of a sealant 9, which can be, for example, a sealing ring. A second receiving space 10, a third receiving space 11, and a fourth receiving space 12 are furthermore provided between the central housing part 4, on the one hand, and the lower housing part 5 or the transmission housing 6, on the other hand. The second receiving space 10 is connected therein to the oil chamber 13 of the transmission housing 6, the third receiving space 11 is connected to the pneumatic chamber 14 of the transmission housing 6, and the fourth receiving space 12 is connected to the clutch chamber 15 of the transmission housing 6. In the region of the mutually adjacent surfaces of the central housing part 4 and the lower housing part 5 are again provided sealants 16, which can likewise be constructed as sealing rings and produce a mutual seal between the receiving spaces 10, 11, 12, or seal of the receiving spaces 10, 11, 12 with respect to the environment. The previously described sealants 9 produces also a seal of the first receiving space 8 with respect to the environment and the other receiving spaces 10, 11, 12.

An electronic control unit 17, which is fastened directly in a recess 18 within the upper housing part 3 by means of adhesive, is arranged in the first receiving space 8. In this first receiving space 8 is thus located merely the electronic control unit 17, which is protected in this way especially against external influences. A first mechatronic component 19, which is constructed as a sensor module, is arranged in the second receiving space 10. A second mechatronic component 20, which is constructed as a valve module in this example, is arranged in the third receiving space 11. A third mechatronic component 21, which is constructed as a clutch sensor, is arranged in the fourth receiving space 12.

The first, second and third mechatronic components 19, 20, 21 are fastened with the aid of screws 22 on the upper housing part 3. The mentioned mechatronic components 19, 20, 21 are moreover fastened on the upper housing part 3, with the central housing part section 23 of the housing arranged between them. The central housing part 4 is also fastened in this way by fastening the mechatronic components 19, 20, 21 on the upper housing part 3. The upper housing part 3 is moreover constructed as a single piece, so that all of the mechatronic components can be fastened on the same upper housing part 3 before the transmission control 1 is installed.

Figure 2:
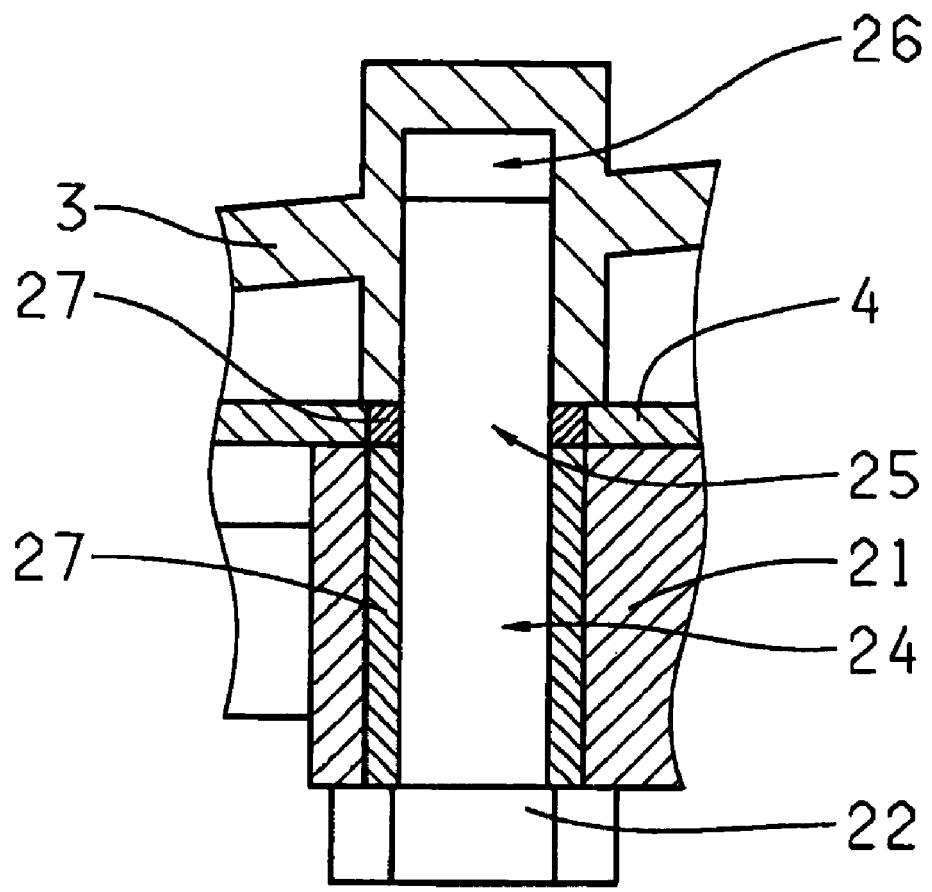

FIG. 2 shows the fastening of the third mechatronic component 21 with the aid of screws 22 in sectional representation as an example for the other mechatronic components 19, 20. The screws 22 extend thus through a recess 24 in the third mechatronic component 21, through a recess 25 in the central housing part 4, and in a bore 26 in the upper housing part 3, in which a thread (not shown) is provided. Sleeve-shaped bushings 27 of metal are provided in the recesses 24, 25, through which the screw 22 extends in order to protect the mechatronic component 21 and the central housing part 4 in the region of the recesses 24, 25.

The central housing part 4 has also cast electronic conductors C for connecting the electronic control unit and/or the mechatronic components 19, 20, 21, which are cast into the central housing part 4. Connections 28 of the electric conductors C are also arranged on the central housing part 4. The connections 28 are moreover arranged in such a way that the electronic control unit 17 and the mechatronic components 19, 20, 21 are automatically connected to the respective connection 28 when the control unit 17 or the mechatronic components 19, 20, 21 are fastened onto the upper housing part 3, with the central housing part 4 between them. An external connection 29 for connecting the electronic control unit 17 to an external device, such as a manually operable control device, is also provided on the central housing part 4.

The process for installation of the transmission control 1 will be described below. The electronic control unit 17 is first fastened in the recess 18 in the upper housing part 3 by gluing it in the recess. The electronic control unit 17 is thus fastened directly on the upper housing part 3. The central housing part 4 is subsequently positioned on the upper housing part 3. The mechatronic components 19, 20, 21 are thereafter fastened with the aid of the screws 22 on the upper housing part 3, with the central housing part sections 23 of the housing positioned between them. A unit consisting of the upper housing part 3, the central housing part 4, the electronic control unit 17, and the mechatronic components 19, 20, 21 is produced in this way, whereby an electric connection between the control unit 17 and the mechatronic components 19, 20, 21 is produced in the central housing part 4 already by means of the connections 28 and the electric conductors (not shown). Only the upper housing part 3 together with the electronic control unit 17, the mechatronic components 19, 20, 21, and the central housing part 4 still has to be fastened on the lower housing part 5. This is carried out by connecting the upper housing part 3, via the screws 7, to the transmission housing 6 such that the central housing part 4 or the lower housing part 5 is sandwiched therebetween.

REFERENCE NUMERALS

1 Transmission control
2 Multi-part housing
3 Upper housing part
4 Central housing part
5 Lower housing part
6 Transmission housing
7 Screw
8 First receiving space
9 Sealant
10 Second receiving space
11 Third receiving space
12 Fourth receiving space
13 Oil chamber
14 Pneumatic chamber
15 Clutch chamber
16 Sealant
17 Electronic control unit
18 Recess
19 First mechatronic component
20 Second mechatronic component
21 Third mechatronic component
22 Screws
23 Central housing part sections
24 Recess
25 Recess
26 Bore
27 Bushing
28 Connection
29 Outer connection

The invention claimed is:

1. A transmission control (1) comprising:
an electronic control unit (17),
at least one mechatronic component (19, 20, 21),
a housing (2) comprising an upper housing part (3), a lower housing part (5), and a central housing part (4) being sandwiched between the upper housing part (3) and the lower housing part (5),
the central housing part at least partially forming at least one receiving space (8, 10, 11, 12), between the upper housing part (3) and the lower housing part (5), for accommodating both the control unit (17) and the at least one mechatronic component (19, 20, 21),
the control unit (17) and the at least one mechatronic component (19, 20, 21) both being fastened to the upper housing part (3), and
one of the electronic control unit (17) and the at least one mechatronic component (19, 20, 21) abutting against the upper housing part (3), with a central housing part section (23) interposed between the control unit (17) and the at least one mechatronic component (19, 20, 21), and the central housing part (4) being fastened to the upper housing part (3) by the fastening of the electronic control unit (17) and the at least one mechatronic component (19, 20, 21) to the housing upper part (3).

2. The transmission control according to claim 1, wherein the upper housing part (3) is a single piece.

3. The transmission control according to claim 1, wherein electric conductors are provided on the central housing part (4) for connecting at least one of the electronic control unit (17) and the at least one mechatronic component (19, 20, 21), whereby connections (28) of the electric conductors are arranged on the central housing part (4) such that at least one of the electronic control unit (17) and the at least one mechatronic component (19, 20, 21) is automatically connected to the connection (28) when at least one of the control unit (17) and the at least one mechatronic component is fastened on the upper housing part (3).

4. The transmission control according to claim 1, wherein seals (9, 16) are provided on at least one of the upper housing part (3), the lower housing part (5), and the central housing part (4) by which a mutual sealing is produced between either respective receiving spaces (8, 10, 11, 12) or the receiving spaces (8, 10, 11, 12) and an external environment.

5. The transmission control according to claim 1, wherein the upper housing part (3) and the lower housing part (5) are made of metal and the central housing part (4) is made of plastic.

6. The transmission control according to claim 1, wherein the lower housing part (5) is formed integrally with a transmission housing.

7. The transmission control according to claim 1, wherein the upper housing part (3) is fastened to a transmission housing (6) with the central housing part (4) and the housing lower part (5) interposed therebetween.

8. The transmission control according to claim 1, wherein the upper housing part (3) and the lower housing part (5) only indirectly border one another.

9. The transmission control according to claim 1, wherein the central housing part (4), located between the upper housing part (3) and the lower housing part (5), is visible from an exterior of the housing (2).

10. The transmission control according to claim 1, wherein an outer connection (29), for connecting the electronic control unit (17) to an external device, is provided on the central housing part (4).

11. The transmission control according to claim 1, wherein the at least one mechatronic component (19, 20, 21) is either a sensor or an actuator.

12. The transmission control according to claim 1, wherein, when the transmission control is mounted to the transmission, the central housing part (4) spaces and separates the upper housing part (3) from both the lower housing part (5) and the transmission.

13. The transmission control according to claim 1, wherein both the control unit (17) and the at least one mechatronic component (19, 20, 21) are completely accommodated within an interior space defined by the upper housing part (3) and the lower housing part (5).

14. The transmission control according to claim 1, wherein the upper housing part (3) and the lower housing part (5) are made of metal and the central housing part (4) is made of plastic;
the upper housing part (3) is fastened to a transmission housing (6) with the central housing part (4) and the housing lower part (5) interposed therebetween such that the upper housing part (3) and the lower housing part (5) only indirectly border one another;
the central housing part (4), located between the upper housing part (3) and the lower housing part (5), is visible from an exterior of the housing (2); and
an outer connection (29), for connecting the electronic control unit (17) to an external device, is provided on the central housing part (4).

15. The transmission control according to claim 1, wherein the at least one electronic control unit (17) is fastened directly to and directly abuts against a surface of the upper housing part (3).

16. The transmission control according to claim 15, wherein the central housing part (4) is constructed such that a first receiving space (8) is delimited solely by the upper housing part (3) and the central housing part (4) and is sealed with respect to other receiving spaces (10, 11, 12) for the mechatronic components (19, 20, 21), and only the electronic control unit (17) is arranged within the first receiving space (8).

17. The transmission control according to claim 1, wherein at least one of the electronic control unit (17) and the mechatronic component (19, 20, 21) are fastened by screws (22) to the upper housing part (3).

18. The transmission control according to claim 17, wherein the screws (22) extend through recesses (24, 25) in at least one of the control unit (17), the at least one mechatronic component (19, 20, 21) and the central housing part (4), and a bushing (27) is provided in the recess (24, 25).

19. A method of installation of a transmission control (1) comprising an electronic control unit (17), at least one mechatronic component (19, 20, 21), and a housing (2) comprising an upper housing part (3), a lower housing part (5), and a central housing part (4), which forms at least one receiving space (8, 10, 11, 12) for at least the control unit (17) and the at least one mechatronic component (19, 20, 21), the at least one receiving space (8, 10, 11, 12) is arranged between the upper housing part (3) and the lower housing part (5), both the control unit (17) and the at least one mechatronic component (19, 20, 21) are fastened directly to the upper housing part (3), and at least one of the electronic control unit (17) and the at least one mechatronic component (19, 20, 21) is directly fastened to and abutting against the upper housing part (3) with a central housing part section (23) interposed between the control unit (17) and the at least one mechatronic component (19, 20, 21), and the central housing part (4) is fastened to the upper housing part (3) by the fastening of the electronic control unit (17) and the at least one mechatronic component (19, 20, 21) to the housing upper part (3), the method comprising the steps of:

preparing, the upper housing part, the central housing part, and the lower housing part, as well as the electronic control unit and the at least one mechatronic component of the transmission control;

fastening the electronic control unit directly to the upper housing part;

fastening the at least one mechatronic component to the upper housing part with a central housing part positioned therebetween; and fastening the upper housing part together with at least one of the electronic control unit and the mechatronic component and the central housing part to the lower housing part.

20. A transmission control (1) comprising an electronic control unit (17), at least one mechatronic component (19, 20, 21), an independent upper housing part (3), an independent central housing part (4), a lower housing part (5) that is formed integrally with a transmission housing (6), the upper housing part (3) being secured to the lower housing part (5) with the central housing part (4) being sandwiched therebetween such that a first receiving space (8) is formed between and defined by the upper housing part (3) and the central housing part (4) and a second receiving space (11) is formed between the central housing part (4) and the lower housing part (5), the first receiving space (8) accommodating both the control unit (17) and the at least one mechatronic component (19, 20, 21) with the control unit (17) being fastened directly to the housing upper part (3), and the mechatronic component (19, 20, 21) also being fastened on the upper housing part (3) but spaced from the upper housing part by both the central housing part (4) and the control unit (17), and the central housing part and the at least one mechatronic component (19, 20, 21) being fastened to the upper housing part by at least one common fastener (22).

\* \* \* \* \*